(12) United States Patent
Kim et al.

(10) Patent No.: US 11,941,845 B2
(45) Date of Patent: Mar. 26, 2024

(54) APPARATUS AND METHOD FOR ESTIMATING CAMERA POSE

(71) Applicant: MAXST CO., LTD., Seoul (KR)

(72) Inventors: Sang Rok Kim, Seoul (KR); Kyu Sung Cho, Gyeonggi-do (KR); Jae Wan Park, Gyeonggi-do (KR); Tae Yun Son, Gyeonggi-do (KR); Hyung Min Lee, Gyeonggi-do (KR)

(73) Assignee: MAXST CO., LTD., Seoul (KR)

( * ) Notice: Subject to any disclaimer, the term of this patent is extended or adjusted under 35 U.S.C. 154(b) by 363 days.

(21) Appl. No.: 17/428,707

(22) PCT Filed: Sep. 22, 2020

(86) PCT No.: PCT/KR2020/012753
§ 371 (c)(1),
(2) Date: Aug. 5, 2021

(87) PCT Pub. No.: WO2022/050473
PCT Pub. Date: Mar. 10, 2022

(65) Prior Publication Data
US 2022/0309703 A1    Sep. 29, 2022

(30) Foreign Application Priority Data

Sep. 1, 2020  (KR) .................. 10-2020-0111097

(51) Int. Cl.
*G06T 7/73* (2017.01)
*G06V 10/74* (2022.01)
*G06V 10/762* (2022.01)

(52) U.S. Cl.
CPC .............. *G06T 7/74* (2017.01); *G06V 10/761* (2022.01); *G06V 10/762* (2022.01); *G06T 2207/30244* (2013.01)

(58) Field of Classification Search
CPC ... G06T 7/74; G06T 2207/30244; G06T 7/11; G06T 7/50; G06V 10/761; G06V 10/762; G06V 10/245; G06F 16/53; G06F 16/56
See application file for complete search history.

(56) References Cited

U.S. PATENT DOCUMENTS

| 9,324,151 B2 * | 4/2016 | Snavely ................... G06T 7/75 |
| 2005/0190972 A1 * | 9/2005 | Thomas ............... H04N 5/2224 382/218 |

(Continued)

FOREIGN PATENT DOCUMENTS

| JP | 2016-162013 A | 9/2016 |
| KR | 10-2015-0096922 A | 8/2015 |

(Continued)

*Primary Examiner* — Tom Y Lu
(74) *Attorney, Agent, or Firm* — The PL Law Group, PLLC

(57) ABSTRACT

An apparatus for estimating a camera pose according to an embodiment of the present disclosure includes a similar image searcher, a clusterer, and an estimator. The similar image searcher searches for a plurality of images similar to an input image, from among a plurality of previously-stored images, based on the input image. The clusterer creates a cluster including at least some similar images meeting predetermined conditions, from among the plurality of similar images, based on viewpoint data tagged to each of the plurality of similar images. The estimator estimates a pose of a camera that has generated the input image, based on the cluster.

8 Claims, 5 Drawing Sheets

(56) References Cited

U.S. PATENT DOCUMENTS

2013/0243250 A1* 9/2013 France ................... G06V 20/10
    382/103
2017/0205832 A1* 7/2017 Iimura ................... H04N 7/185

FOREIGN PATENT DOCUMENTS

| KR | 10-2017-0097266 A | 8/2017 |
| KR | 10-1851303 B1 | 4/2018 |
| KR | 10-2020-0102108 A | 8/2020 |

* cited by examiner

APPARATUS AND METHOD FOR ESTIMATING CAMERA POSE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/012753, filed on Sep. 22, 2020, which claims priority to the benefit of Korean Patent Application No. 10-2020-0111097 filed in the Korean Intellectual Property Office on Sep. 1, 2020, the entire contents of which are incorporated herein by reference.

BACKGROUND

Technical Field

Embodiments disclosed herein relate to a technology for estimating a camera pose.

Background Art

A method of estimating a camera pose may typically be a method of directly obtaining a six-dimensional (6D) pose on a three-dimensional (3D) map for an input image. This method includes: a feature point extraction step of extracting relevant feature points from a two-dimensional (2D) image with a feature point extraction algorithm; a feature point verification step of matching the extracted feature points of input image pairs and detecting valid matching pairs; and a pose estimation step of mapping each of the verified feature points to one of points provided in a 3D point cloud and estimating which pose (i.e., a rotation/translation matrix) a camera coordinate system has, using a coordinate transformation algorithm based on coordinates of a mapped 3D point on the world coordinate system and pixel coordinates of a 2D feature point.

Algorithms, such as scale-invariant feature transform (SIFT), speeded-up robust features (SURF), and features from accelerated segment test (FAST), may be used as feature point extraction methods. Such an existing feature point extraction and matching algorithm based on local features shows better performance when an image includes fewer and simpler objects. However, in the case of an image, such as a downtown image or a road image, including a variety of dynamic objects in a large number, feature points may not be extracted therefrom, which is problematic.

In order to solve this problem, provided is a method of performing camera pose estimation using a step of finding images similar to an input image using an image retrieval algorithm. However, according to this technology, camera estimation may not be properly performed when an incorrect image is determined to be an image similar to the input image in the retrieval step. Due to the trade-off relationship between the performance and the time cost of the image retrieval algorithm, time and costs may be incurred in the process of improving the performance of the image retrieval algorithm.

SUMMARY

Embodiments disclosed herein are intended to provide an apparatus and method for estimating a camera pose.

According to an embodiment, provided is an apparatus for estimating a camera pose. The apparatus may include: a similar image searcher configured to search for a plurality of images similar to an input image, from among a plurality of previously-stored images, based on the input image; a clusterer configured to create a cluster including at least some similar images meeting predetermined conditions, from among the plurality of similar images, based on viewpoint data tagged to each of the plurality of similar images; and an estimator configured to estimate a pose of a camera that has generated the input image, based on the cluster.

The clusterer may calculate distances between a reference image arbitrarily selected from the plurality of similar images and a plurality of remaining similar images except for the reference image, from among the plurality of similar images, based on the viewpoint data tagged to each of the plurality of similar images, and create the cluster based on the calculated distance.

The clusterer may determine one or more similar images, of which the calculated distance being equal to or shorter than a predetermined distance, from among the plurality of remaining similar images, to be image adjacent to the reference image, and create a cluster based on a number of the one or more adjacent images.

When the number of the one or more adjacent images is equal to or greater than a predetermined number, the clusterer may create the cluster including the reference image and the one or more adjacent images.

The estimator may extract one or more feature points from each of the images included in the cluster and estimate the pose of the camera based on the extracted one or more feature points.

According to an embodiment, provided is a method of estimating a camera pose. The method may comprise: searching for a plurality of images similar to an input image, from among a plurality of previously-stored images, based on the input image; creating a cluster including at least some similar images meeting predetermined conditions, from among the plurality of similar images, based on viewpoint data tagged to each of the plurality of similar images; and estimating a pose of a camera that has generated the input image, based on the cluster.

The creating the cluster may comprise respectively calculating distances between a reference image arbitrarily selected from among the plurality of similar images and a plurality of remaining similar images except for the reference image, based on the viewpoint data tagged to each of the plurality of similar images, and creating the cluster based on the calculated distance.

The creating the cluster may comprise determining one or more similar images, of which the calculated distance being equal to or shorter than a predetermined distance, from among the plurality of remaining similar images, to be image adjacent to the reference image, and creating the cluster based on a number of the one or more adjacent images.

When the number of the one or more adjacent images is equal to or greater than a predetermined number, the creating of the cluster may comprise creating the cluster including the reference image and the one or more adjacent images.

The estimating the pose of the camera that has generated the input image may comprise extracting one or more feature points from each of images included in the cluster and estimating the pose of the camera based on the extracted one or more feature points.

According to embodiments disclosed herein, it is possible to provide a process of verifying similar images in a short time and at a low cost by clustering searched images similar to an input image, based on a tagged viewpoint. Accordingly, the accuracy of camera pose estimation may be improved by the low-cost and rapid verification process.

DETAILED DESCRIPTION

Hereinafter, specific embodiments will be described with reference to the accompanying drawings. The following detailed description is provided to assist in a comprehensive understanding of at least one of a method, a device, and a system to be described herein. However, the detailed description is merely an example, and the present disclosure is not limited thereto.

In the description of embodiments of the present disclosure, a detailed description of known technologies related to the present disclosure will be omitted in the situation in which the subject matter of the present disclosure may be rendered rather unclear thereby. Terms to be used hereinafter will be defined in consideration of functions thereof in embodiments of the present disclosure, but may vary depending on the intentions of users or operators, as well as practices. Therefore, the terms shall be defined based on the description throughout the specification. The terms used in the detailed description shall be interpreted as being illustrative, while not being limitative, of embodiments. Unless clearly used otherwise, a singular form includes a plural meaning. It shall be understood that expressions such as "comprise", "include", and "have" used herein are for indicating certain features, numbers, steps, operations, elements, a part or combinations thereof and are not excluding presence or possibility of one or more features, numbers, steps, operations, elements, a part or combinations thereof other than the above.

Figure 1:
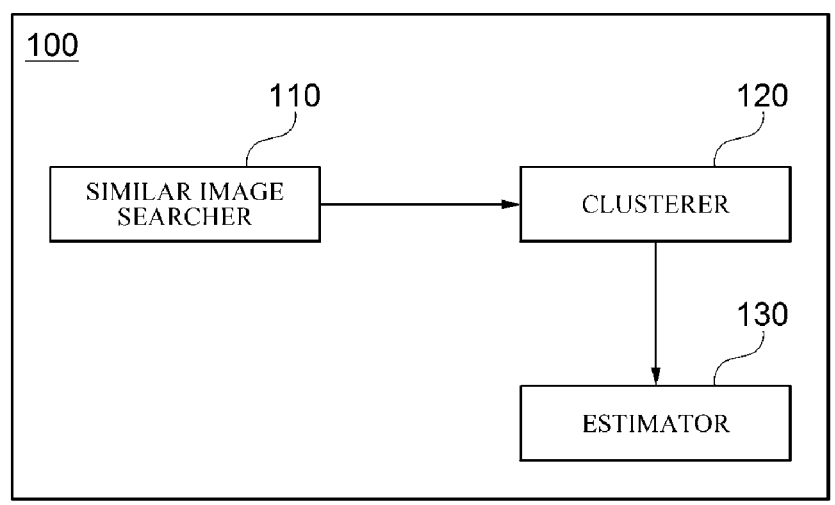
FIG. 1 is a block diagram illustrating an apparatus for estimating a camera pose according to an embodiment.

FIG. 1 is a block diagram illustrating an apparatus for estimating a camera pose according to an embodiment.

Referring to FIG. 1, the illustrated apparatus 100 for estimating a camera pose includes a similar image searcher 110, a clusterer 120, and an estimator 130.

In the illustrated embodiment, respective components may have different functions and abilities other than those described below and may include additional components other than those described below.

In addition, according to an embodiment, the similar image searcher 110, the clusterer 120, and the estimator 130 may be realized using one or more physically separated units or may be realized using one or more processors or a combination of one or more processors and software. Differently from the illustration, specific operations of the similar image searcher 110, the clusterer 120, and the estimator 130 may not be clearly distinguishable from each other.

The similar image searcher 110 searches for a plurality of images similar to an input image, from among a plurality of previously-stored images, based on the input image.

According to an embodiment, the similar image searcher 110 may search for images similar to the input image from among the plurality of previously-stored images using an image retrieval algorithm. Here, the image retrieval algorithm may refer to an algorithm by which, after an artificial neural network is trained using regional or global features of images, a similar image having a highest similarity is found by comparing the features of the input image with the features of the trained images.

The clusterer 120 creates a cluster including at least some similar images meeting predetermined conditions, from among the plurality of similar images, based on viewpoint data tagged to each of the plurality of similar images.

Here, according to an embodiment, the viewpoint data may include information related to positions in which the images are captured. For example, the viewpoint data may include data comprised of low-dimensional real values, such as position coordinates, latitudes and longitudes, and azimuth.

The clusterer 120 may additionally verify whether or not each of the plurality of similar images searched by the similar image searcher 110 is actually similar to the input image using viewpoint data tagged to the plurality of similar images.

Thus, differently from a typical existing similar image classification algorithm in which feature dimensions of training data are increased to improve accuracy or performance or an additional verification step is performed using high-dimensional data at high cost, it is possible to significantly reduce the capacity of memory required, the complexity of calculation, and the like according to an embodiment when compared to the existing method, since the intended purpose may be obtained without the above-described process.

In this case, whether or not an image is similar to the input image may mean whether or not the image includes an object the same as an object (e.g., a building or a fixed sculpture) included in the input image.

Here, the similar image may refer to an image including an object the same as an object included in the input image or an image including an object different from but having a similar appearance to the object included in the input image.

The image including the object the same as the object included in the input image may mean an image actually similar to the input image.

According to an embodiment, the clusterer 120 may arbitrarily select one similar image from among the plurality of similar images and set the selected similar image to be a reference image.

In addition, the clusterer 120 may respectively calculate distances between the reference image and a plurality of remaining similar images except for the reference image, from among the plurality of similar images, based on the viewpoint data tagged to each of the plurality of similar images, and create a cluster based on the calculated distances.

Here, according to an embodiment, the distances between the reference image and the plurality of remaining similar images may be, for example, Euclidean distances, cosine similarities, or the like.

In addition, according to an embodiment, the clusterer 120 may determine one or more similar images, of which the calculated distance being equal to or shorter than a predetermined distance, from among the plurality of remaining similar images, to be image adjacent to the reference image, and create a cluster based on the number of the one or more adjacent images.

Specifically, according to an embodiment, when the number of the one or more adjacent images of the reference image is equal to or greater than a predetermined number, the clusterer 120 may create the cluster including the reference image and the one or more adjacent images.

Here, when the number of the one or more adjacent images of the reference image is less than the predetermined number, the clusterer 120 may create a cluster by repeating the above-described operation of determining one or more adjacent images while selecting a different reference image from among the plurality of similar images until the number of the one or more adjacent images of the reference image is equal to or greater than the predetermined number.

That is, the distances between images including the same objects based on the viewpoint data are necessarily short, but the distances between images including different objects based on the viewpoint data are necessarily longer than the distances between the images including the same objects.

In addition, even though some similar images each including an object different from the object in the input image are included in the plurality of similar images searched by the similar image searcher 110, it is highly probable that the number of the similar images each including the same object as the input image is greater than the number of the similar images each including the object different from the object in the input image.

Thus, the clusterer 120 may select similar images each including the same object as the input image, from among the plurality of searched similar images, through the above-described clustering operation.

The estimator 130 estimates the pose of a camera that has generated the input image, based on the cluster.

The estimator 130 may extract a feature point from each of the images included in the cluster and estimate the pose of the camera based on the extracted feature points.

Here, an algorithm for extracting and matching feature points to estimate the pose of the camera may be implemented as one of algorithms, such as scale-invariant feature transform (SIFT), speeded-up robust features (SURF), and features from accelerated segment test (FAST), for extracting relevant features, such as a corner, an edge, and a line, and deep learning-based technologies for detecting major feature points by learning an image itself by artificial neural network training.

In addition, as an algorithm for verifying matched feature points, random sample consensus (RANSAC) may be representative. As a coordinate transformation algorithm, a Perspective-n-Point (PnP) algorithm may be representative.

Figure 2:
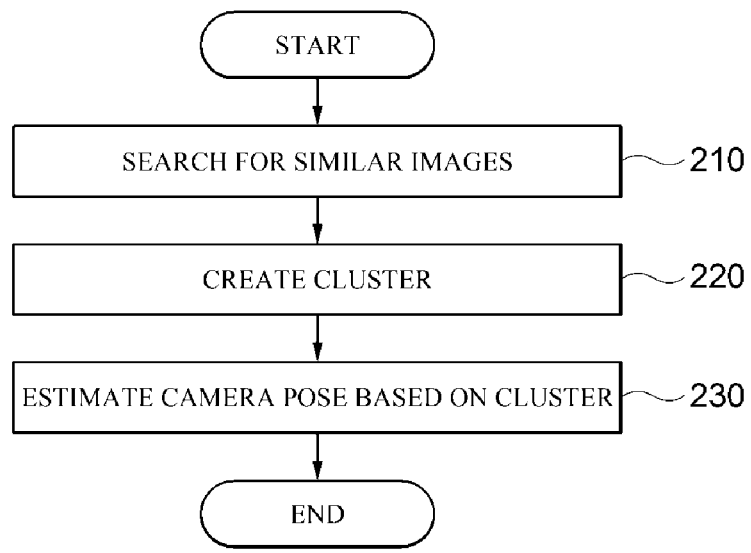
FIG. 2 is a flowchart illustrating a method of estimating a camera pose according to an embodiment.

FIG. 2 is a flowchart illustrating a method of estimating a camera pose according to an embodiment.

The method illustrated in FIG. 2 may be performed by the apparatus 100 for estimating a camera pose illustrated in FIG. 1.

Referring to FIG. 2, first, the apparatus 100 for estimating a camera pose searches for a plurality of images similar to an input image, from among a plurality of previously-stored images, based on the input image (210).

Afterwards, the apparatus 100 for estimating a camera pose creates a cluster including at least some similar images meeting predetermined conditions, from among the plurality of similar images, based on viewpoint data tagged to each of the plurality of similar images (220).

Specifically, according to an embodiment, the apparatus 100 for estimating a camera pose may calculate distances between an image selected from among the plurality of similar images and a plurality of remaining similar images except for the selected image, based on the viewpoint data tagged to each of the plurality of similar images, and create a cluster based on the calculated distances.

In addition, according to an embodiment, the apparatus 100 for estimating a camera pose may determine similar images, of which the calculated distance being equal to or shorter than a predetermined distance, from among the plurality of remaining similar images, to be image adjacent to the reference image, and create the cluster based on the number of the one or more adjacent images.

Afterwards, the apparatus 100 for estimating a camera pose estimates the pose of a camera that has generated the input image, based on the cluster (230).

Specifically, according to an embodiment, the apparatus 100 for estimating a camera pose may extract a feature point from each of the images included in the cluster and estimate the pose of the camera based on the extracted feature points.

Figure 3:
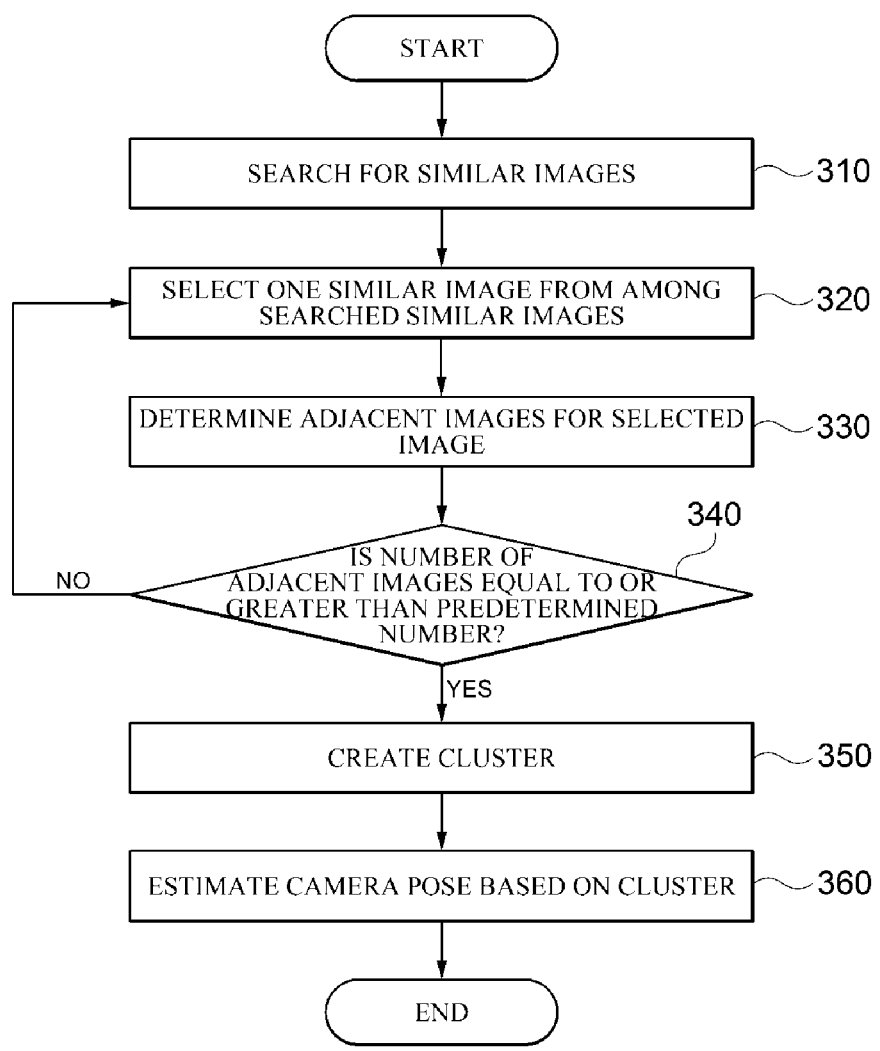
FIG. 3 is a flowchart illustrating a clustering method according to an embodiment.

FIG. 3 is a flowchart illustrating a clustering method according to an embodiment.

The method illustrated in FIG. 3 may be performed by the apparatus 100 for estimating a camera pose illustrated in FIG. 1.

Referring to FIG. 3, first, the apparatus 100 for estimating a camera pose may search for a plurality of images similar to an input image, from among a plurality of previously-stored images, based on the input image (310).

Afterwards, the apparatus 100 for estimating a camera pose may select one similar image from among the plurality of searched similar images (320).

Subsequently, the apparatus 100 for estimating a camera pose may determine similar images, of which the calculated distance being equal to or shorter than a predetermined distance, from among remaining similar images except for the selected image, to be images adjacent to the selected image (330).

Afterwards, when the number of the determined one or more adjacent images is equal to or greater than a predetermined number, a cluster including the selected image and the one or more adjacent images may be created (350).

Here, when the number of the determined one or more adjacent images is less than the predetermined number, the apparatus 100 for estimating a camera pose may repeat the steps 320 to 340 by reselecting another similar image from among the plurality of remaining similar images, except for the previously-selected image.

After the step 350, the apparatus 100 for estimating a camera pose may estimate the pose of a camera that has generated the input image, based on the cluster.

Figure 4:
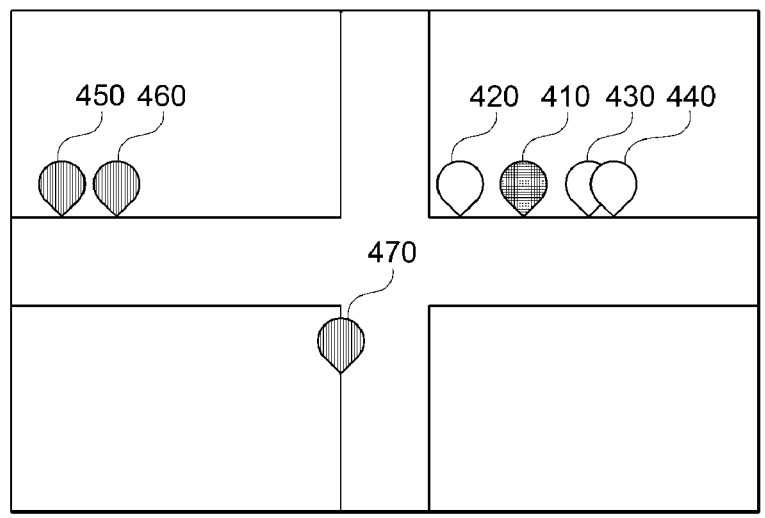
FIG. 4 is a view illustrating the position of an input image and the positions of similar images obtained by similar image search according to an embodiment.

FIG. 4 is a view illustrating the position of an input image and the positions of similar images obtained by search for images similar to the input image, marked on a map based on viewpoint data, according to an embodiment.

Specifically, FIG. 4 illustrates the position 410 of the input image and the positions 420, 430, 440, 450, 460, and 470 of the similar images marked on a map, the similar images being searched using an image retrieval algorithm.

When two different objects have similar global features, an image including one of the two objects may be searched by the image retrieval algorithm to be similar to the input image including the other of the two objects.

Here, the positions 420, 430, and 440 of the similar images each including the same object as the input image, from among the searched similar images, are close to the position 410 of the input image, whereas the positions 450, 460, and 470 of the similar images each including an object different from the object of the input image are relatively remote from the position 410 of the input image.

Figure 5:
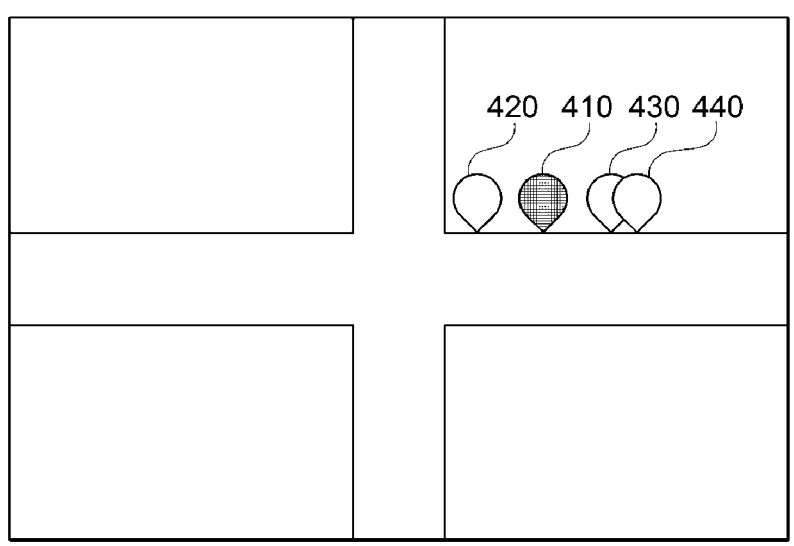
FIG. 5 is a view illustrating the position of an input image and the positions of clustered images from among the searched similar images according to an embodiment.

FIG. 5 is a view illustrating the positions of images included in a cluster created by clustering, marked on a map based on viewpoint data, according to an embodiment.

Specifically, FIG. 5 illustrates the position 410 of the input image and the positions 420, 430, 440 of the similar images included in the cluster created by clustering, from among the positions 420, 430, 440, 450, 460, and 470 of the similar images illustrated in FIG. 4, on the map. As can be seen from the example illustrated in FIG. 5, even in the case that similar images each including the object different from the object of the input image are included in the similar images obtained by the search based on the input image, similar images each including the same object as the input image may be selected by the above-described clustering.

Figure 6:
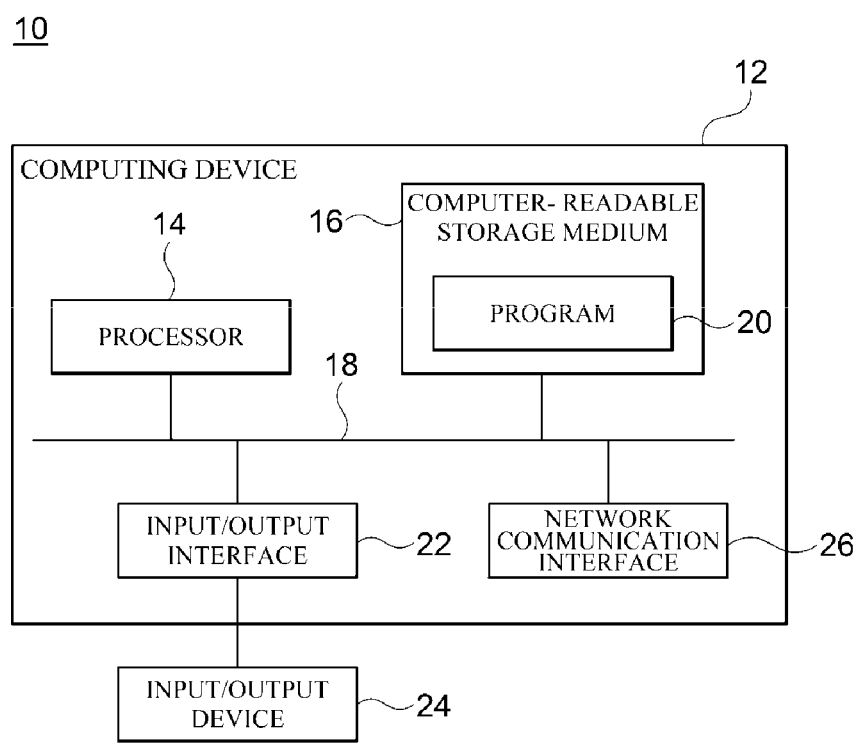
FIG. 6 is a block diagram illustrating a computing environment including a computing device according to an embodiment.

FIG. 6 is a block diagram illustrating a computing environment 10 including a computing device according to an embodiment. In the illustrated embodiment, each of components may have different functions and ability in addition to those described below, and further components other than those described below may be included.

The illustrated computing environment 10 includes a computing device 12. In an embodiment, the computing device 12 may be the apparatus 100 for estimating a camera pose.

The computing device 12 includes at least one processor 14, a computer-readable storage medium 16, and a communication bus 18. The processor 14 may control the computing device 12 to operate according to the above-described illustrative embodiments. For example, the processor 14 may execute one or more programs stored in the computer-readable storage medium 16. The one or more programs may include one or more computer-executable instructions. The computer-executable instructions may be configured to, when executed by the processor 14, cause the computing device 12 to perform the operations according to the illustrative embodiments.

The computer-readable storage medium 16 is configured to store not only the computer-executable instructions, but also program codes, program data, and/or other suitable forms of information. A program 20 stored in the computer-readable storage medium 16 includes a set of instructions executable by the processor 14. In an embodiment, the computer-readable storage medium 16 may be implemented as a memory (e.g., a volatile memory such as a random access memory (RAM), a non-volatile memory, or a suitable combination thereof), one or more magnetic disk storage devices, optical disk storage devices, flash memory devices, other forms of storage media accessible by the computing device 12 and able to store intended information, or suitable combinations thereof.

The communication bus 18 connects a variety of different components of the computing device 12, including the processor 14 and the computer-readable storage medium 16.

The computing device 12 may also include one or more input/output interfaces 22 providing interfaces for one or more input/output devices 24 and one or more network communication interfaces 26. The input/output interfaces 22 and the network communication interfaces 26 are connected to the communication bus 18. The input/output devices 24 may be connected to other components of the computing device 12 through the input/output interfaces 22. The illustrative input/output devices 24 may include input devices, such as a pointing device (e.g., a mouse or a track pad), a keyboard, a touch input device (e.g., a touch pad or a touchscreen), a voice or audio input device, various types of sensor devices, and/or an image capturing device; and/or output devices, such as a display device, a printer, a speaker, and/or a network card. The illustrative input/output devices 24 may be included inside the computing device 12 as components of the computing device 12 or be connected to the computing device 12 as separate devices distinct from the computing device 12.

The embodiments of the present disclosure may include a program for running the methods described herein on a computer and a computer-readable recording medium including the program. The computer-readable recording medium may include program instructions, local data files, local data structures, and the like, alone or in a combination thereof. The medium may be specially designed and configured for the present disclosure or may be known to and used by a person having ordinary skill in the field of computer software. Examples of the computer-readable recording medium may include magnetic media, such as a hard disk, a floppy disk, and a magnetic tape; optical media, such as a compact disc read-only memory (CD-ROM) and a digital versatile disc (DVD); and hardware devices specially configured to store and perform program instructions, such as a ROM, a RAM, and a flash memory. Examples of the program instructions may include machine language code made by a compiler and a high-level language code executable by a computer using an interpreter or the like.

While the exemplary embodiments of the present disclosure have been described in detail hereinabove, a person having ordinary knowledge in the technical field to which the present disclosure pertains will appreciate that various modifications are possible to the foregoing embodiments without departing from the scope of the present disclosure. Therefore, the scope of protection of the present disclosure shall not be limited to the foregoing embodiments but shall be defined by the appended Claims and equivalents thereof.

What is claimed is:

1. An apparatus for estimating a camera pose, the apparatus comprising:
   a similar image searcher configured to search for a plurality of images similar to an input image, from among a plurality of previously-stored images, based on the input image;
   a clusterer configured to calculate distances between a reference image arbitrarily selected from the plurality of similar images and a plurality of remaining similar images except for the reference image, respectively, based on viewpoint data tagged to each of the plurality of similar images and create a cluster including at least two similar images meeting predetermined conditions, from among the plurality of similar images, based on the calculated distances; and
   an estimator configured to estimate a pose of a camera that has generated the input image, based on the cluster.

2. The apparatus according to claim 1, wherein the clusterer determines one or more similar images, of which the calculated distance being equal to or shorter than a predetermine distance, from among the plurality of remaining similar images, to be image adjacent to the reference image, and creates the cluster based on a number of the one or more adjacent images.

3. The apparatus according to claim 2, wherein, when the number of the one or more adjacent images is equal to or greater than a predetermined number, the clusterer creates the cluster including the reference image and the one or more adjacent images.

4. The apparatus according to claim 1, wherein the estimator extracts one or more feature points from each of images included in the cluster and estimates the pose of the camera based on the extracted one or more feature points.

5. A method of estimating a camera pose, the method comprising:

searching for a plurality of images similar to an input image, from among a plurality of previously-stored images, based on the input image;

calculating distances between a reference image arbitrarily selected from among the plurality of similar images and a plurality of remaining similar images except for the reference image, respectively, based on viewpoint data tagged to each of the plurality of similar images, and creating a cluster including at least two similar images meeting predetermined conditions, from among the plurality of similar images, based on the calculated distances; and estimating a pose of a camera that has generated the input image, based on the cluster.

6. The method according to claim 5, wherein the creating of the cluster comprises determining one or more similar images, of which the calculated distance being equal to or shorter than a predetermined distance, from among the plurality of remaining similar images, to be image adjacent to the reference image, and creating the cluster based on a number of the one or more adjacent images.

7. The method according to claim 6, wherein, when the number of the one or more adjacent images is equal to or greater than a predetermined number, the creating of the cluster comprises creating the cluster including the reference image and the one or more adjacent images.

8. The method according to claim 5, wherein the estimating of the pose of the camera that has generated the input image comprises extracting one or more feature points from each of images included in the cluster and estimating the pose of the camera based on the extracted one or more feature points.

* * * * *